May 11, 1937.   E. V. COLLINS   2,079,595
REVERSIBLE SOIL MOVING IMPLEMENT
Filed July 29, 1935   2 Sheets-Sheet 1

Inventor
Edgar V. Collins
by Orwig & Hague
Attys

May 11, 1937. E. V. COLLINS 2,079,595
REVERSIBLE SOIL MOVING IMPLEMENT
Filed July 29, 1935  2 Sheets-Sheet 2
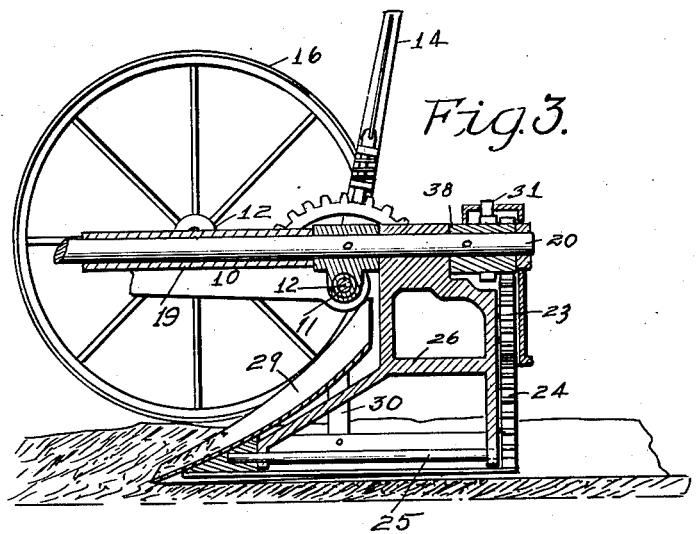
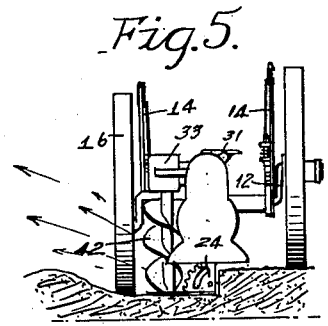
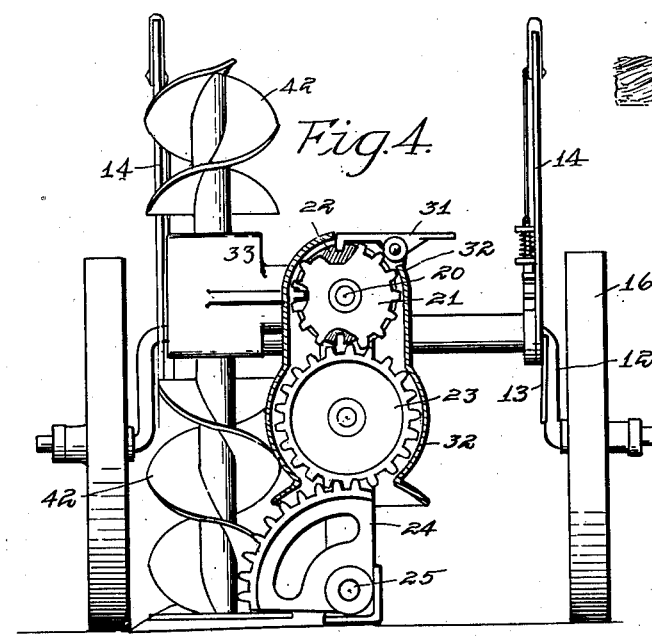
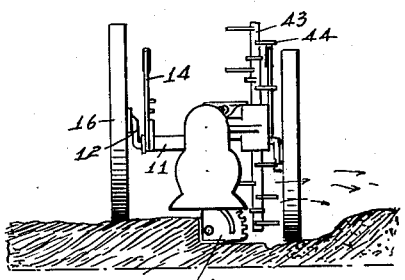
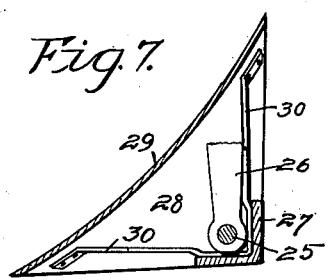
Inventor
Edgar V. Collins Patented May 11, 1937

2,079,595

UNITED STATES PATENT OFFICE 2,079,595

REVERSIBLE SOIL MOVING IMPLEMENT

Edgar V. Collins, Ames, Iowa, assignor to Iowa State College Alumni Association, Incorporated, Ames, Iowa, a corporation of Iowa Application July 29, 1935, Serial No. 33,643

19 Claims. (Cl. 97—43)

The object of my present invention is to provide an implement of this character, of simple, durable and inexpensive construction and in which the implement may be readily, quickly and easily adjusted to throw the furrow slices either to the right or left of the line of advance, as may be desired, so that the machine may be driven backwardly and forwardly across the field and the soil may be thrown from the furrow slices in the same direction, so that in terracing, for instance, all of the soil may be taken from above the proposed terrace site and thrown downwardly toward the terrace, thus avoiding the objections incident to the removal of soil from below the site of the terrace.

Furthermore, in fields where the dead furrow and back furrow are objectionable, the implement may be advanced backwardly and forwardly across the entire field, and all of the soil thrown from the rotor or pulverizer in the same direction, thus eliminating furrows and dead furrows in the field.

A further object is to provide an improved form of reversible plow and also to provide means whereby, upon a reversal of the rotor, the plow will be automatically reversed.

A further object is to provide means of simple and inexpensive construction whereby the hitch between the implement and a tractor may be adjusted laterally when the plow and rotor have been reversed, to thereby prevent excessive side drafts upon the implement when adjusted to throw soil either to the right or left.

My invention consists in the construction, arrangement and combination of the various parts of the device, whereby the objects contemplated are attained, as hereinafter more fully set forth, pointed out in my claims and illustrated in the accompanying drawings, in which:

Figure 3 shows a vertical sectional view through the plow and adjacent portions, and illustrating the means for supporting and reversing the position of the plow.

Figure 4 shows a rear elevation of my improved implement with the rear of the gear case removed and shown in section to illustrate the means for reversing the position of the plow.

Figure 5 shows a reduced rear elevation of my improved implement showing the implement in position for throwing soil toward the left.

Figure 6 is a similar view showing the implement adjusted for throwing soil to the right, and in this view there has been substituted for the helicoid rotor a soil pulverizing element; and Figure 7 shows a vertical sectional view through the plow near its rear end and illustrating the manner in which the movement of the plow is limited and the plow held in proper position when in operation.

Figure 1:
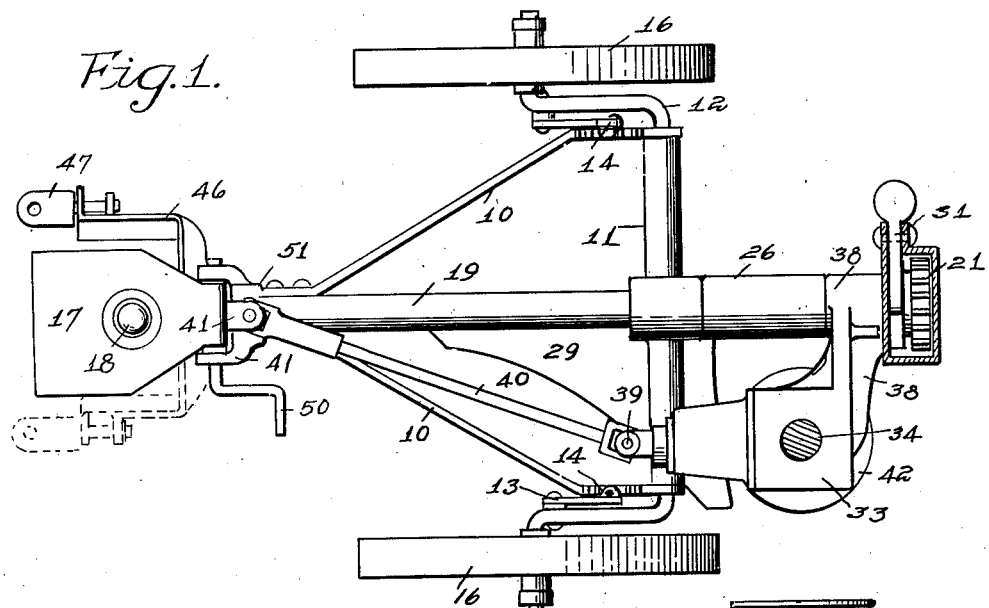
Figure 1 shows a top or plan view of an implement embodying my invention, the upper rotor being removed and its shaft being shown in section, and a portion of the gear casing for reversing the plow being also shown in section, and the adjusted position of the hitch being shown by dotted lines.

Referring to the accompanying drawings, I have used the reference numeral 10 to indicate generally the plow carriage, provided at its rear end with a tubular cross member 11, at each end of which there is mounted a crank axle 12. Connected to each crank axle is a link 13, connected to a bell crank lever 14, having a ratchet device of ordinary construction, and on each crank axle there is a supporting wheel 16. This is the ordinary construction now in use and whereby either wheel may be vertically adjusted relative to the other, so that the carriage will support the plow and the rotor in a substantially upright position when either one of the wheels is down in the furrow.

Connected to the forward end of the carriage is a gear case 17, from which there projects a gear shift lever 18, and there is contained within the case 17 the ordinary gear shift device now commonly employed in automobiles and which, for that reason, is not herein illustrated. Fixed to the gear case is a rearwardly extended tube 19, and in this tube there is a rotor drive shaft 20, to the rear end of which there is fixed a pinion 21 and a notched disc 22. Below the pinion 21 is a second pinion 23, in mesh with the pinion 21, and below the pinion 23 is a toothed sector in mesh with the pinion 23. This toothed sector is fixed to the shaft 25. This shaft 25 is supported by means of a frame 26, the upper end of which is fixed to the shaft 20 and the lower end of which has bearings at each end for the shaft 25, as clearly shown in Figure 3. This frame 26 also carries an angle bar 27, as clearly shown in Figure 7, and mounted upon this angle bar is the plow, indicated generally by the numeral 28. This plow, when viewed from the rear, as shown in Figure 7, is seen to be of substantially triangular shape, except that its working face is curved inwardly, as shown at 29. The plow has no mold board, and when in the position shown in Figure 7, will cut a furrow slice in the ordinary manner and turn it to a substantially upright position but will not move it laterally to any extent.

Obviously, this plow may be reversed in position and tilted to the right, as shown in Figure 7, until the present upright edge of the plow reaches a horizontal position, and when in that position, obviously, the furrow slice will be cut in the same manner and turned to the right instead of to the left.

For limiting the movement of the plow relative to its supporting frame 26 I have provided a stop bar 30, positioned to engage the frame 26 when the plow is in either position of its adjustment. For locking the plow in either of its adjusted positions I have provided a latch 31 pivoted to a gear casing 32, which encloses the gears 21 and 23. This latch is capable of entering the notches in the notched disc 22 to thereby hold such gears against rotation and thus hold the plow against tilting upwardly. The draft of the plow, as is well known, tends to hold it downwardly, and this downward movement is limited by the stop device 30 before described. When it is desired to reverse the plow the latch device is moved to open position, whereupon the gears may be rotated and the plow reversed in its position.

My improved rotor comprises a housing 33, through which is extended a rotor shaft 34 having a beveled pinion 35 thereon. This housing also supports the forwardly extended shaft 36 on which is the beveled pinion 37 in mesh with the pinion 35. Extended laterally from this housing is a bracket 38 rotatably mounted upon and supported by the shaft 20, as shown in Figure 3. At the forward end of the shaft 36 there is a universal joint 39 connected to a shaft 40, and at the forward end of the shaft 40 is a universal joint 41 which connects with the drive shaft from the gear shift device 17. Obviously, by this means variable speeds from the gear shift device 17 may be transmitted to the shaft 34.

Figure 2:
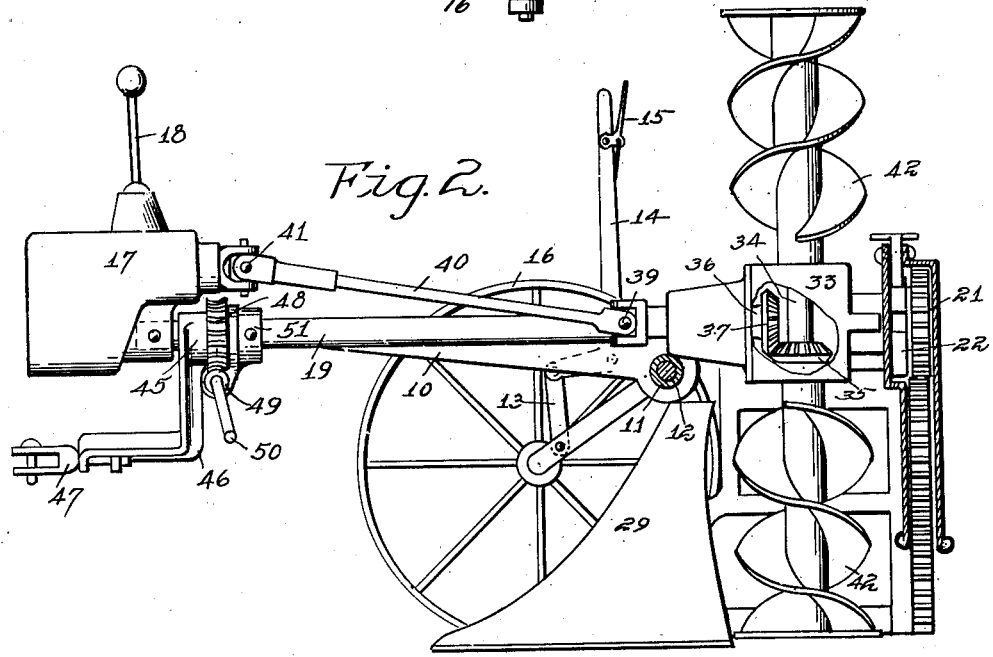
Figure 2 shows a side elevation of my improved implement with one of the plow carriage wheels removed and its axles shown in section, and with a portion of the gear case at the rear shown in section and a portion of the gear case for driving the rotor broken away.

This shaft 34 projects both upwardly and downwardly, as shown in Figure 2, from the housing 33, and on each end thereof there is formed a double helicoid flange 42 similar to the one shown in my aforesaid co-pending application, and performing the same function. For the purpose of limiting the movement of the housing 33, its forward end is projected to position where it will rest upon the carriage member 11, as shown in Figure 2.

This rotor device may be readily and easily grasped by an operator and turned to position with either one of the rotor devices extended upwardly, or it may be turned to position with the shaft of the rotors horizontal. In use, the impact of the furrow slice against the outer surface of the rotor tends to move the rotor against which the furrow slice is being moved inwardly toward the center of the implement, and this movement is limited by the engagement of the housing 33 with the carriage member 11.

In the modified form shown in Figure 6 I have substituted for the helicoid rotor a shaft 43 having flat blades 44 extending outwardly from the shaft. These blades serve the function only of pulverizing the soil and throwing it laterally and downwardly, as illustrated by the arrows in Figure 6, as distinguished from the action of the helicoid flanges in throwing the soil upwardly and laterally, as illustrated by the arrows in Figure 5.

When the plow and rotor have been reversed in the position as above described, it is desirable also to adjust the position of the hitch between the implement and a tractor to avoid excessive side draft, and for this purpose I have provided a hub 45 rotatably mounted upon the sleeve 19 and having an arm 46 extended laterally and then forwardly and provided with a hitch coupling member 47. Fixed to the hub 45 is a worm gear member 48 which engages a worm 49 to which a crank arm 50 is fixed. This worm 49 is seated in a bracket 51 fixed to the sleeve 19. Obviously, by manipulation of the crank arm 50 the hitch may be moved from the position shown by solid lines in Figure 1 to a position shown by dotted lines in said figure.

In practical use, and assuming that the plow and the rotors are at the left, as shown in Figures 4 and 5, then when in operation, the right carriage wheel will be on the land side and the left wheel on the furrow side. The carriage wheels are adjusted in the ordinary manner to the position shown in Figure 5, which maintains the plow and the rotors in upright positions. As the implement is being advanced, a furrow slice is formed and turned to a substantially upright position, then the lower rotor moves forwardly and engages it, and due to the helicoid shape of the flanges, the soil is thrown upwardly and laterally relative to the line of advance. When one furrow is completed the operator releases the latch device 31, grasps the shaft 34 containing the rotors, and turns it one-half revolution so that the opposite one of the rotors is at the bottom of the shaft and the rotor shaft is supported in its upright position by the engagement of its housing 33 with the carriage member 11, and when in this position the rotor shaft, as shown in Figure 4, would be at the right of the gear housing 32 instead of at the left. During this movement of the rotor the pinion 21, which is fixed to the arm 38, is rotated one-half revolution, and this causes the plow to be rotated a one-fourth revolution and moved from its position extended toward the left, as shown in Figure 4, to a position extended toward the right, so that both the rotor and the plow will assume exactly reverse positions from that shown in Figure 4; and when the implement is again advanced in an opposite direction parallel with the first line of advance, the furrow slice will be thrown in the same direction from the furrow as it was in the preceding advance across the field.

In forming terraces for the prevention of soil erosion it is, in many instances, highly desirable that all of the soil be thrown from the furrow side of the eroded area downwardly toward the cite of the terrace, and with my improved implement this may be done very efficiently and without loss of time by simply reversing the position of the plow and the rotor at the end of each trip across the field. As the distance from the furrow to the proposed terrace increases, the gear shift device is operated to increase the speed of the rotor and thereby throw the soil a greater distance. In practice, I have found it entirely practicable to throw the soil from above the proposed terrace site in such a manner as to form a terrace of practicable height without forming an objectionable depression at the upper side of the terrace from which the soil has been removed; and I have found that the position of the rotor and plow may be reversed by the operator very quickly and easily, and thus a great deal of time may be saved as compared with returning the implement one way across the field without operating the plow.

I claim as my invention:

1. In a reversible soil moving implement, the combination of a reversible plow capable in one position of cutting a furrow slice and turning it toward the left of the line of advance and in another position toward the right, and a reversible soil throwing device, capable in one position of engaging the furrow slice when turned to the right and throwing it to the right, and when adjusted to another position capable of engaging the furrow slice when turned to the left and throwing it to the left.

2. In a reversible soil moving implement, the combination of a reversible plow capable in one position of cutting a furrow slice and turning it toward the left of the line of advance and in another position toward the right, and a reversible soil throwing device, capable in one position of engaging the furrow slice when turned to the right and throwing it to the right, and when adjusted to another position capable of engaging the furrow slice when turned to the left and throwing it to the left, said soil throwing device including a helicoid positioned to engage the furrow slice, and means for rotating it.

3. In a reversible soil moving implement, the combination of a reversible plow capable in one position of cutting a furrow slice and turning it toward the left of the line of advance and in another position toward the right, and a reversible soil throwing device, capable in one position of engaging the furrow slice when turned to the right and throwing it to the right, and when adjusted to another position capable of engaging the furrow slice when turned to the left and throwing it to the left, said soil throwing device including a helicoid positioned to engage the furrow slice, means for rotating it, and means for changing its speed of rotation to thereby throw soil to greater or less distances.

4. In a reversible soil moving implement, the combination of a reversible plow capable in one position of cutting a furrow slice and turning it toward the left of the line of advance and in another position toward the right, and a reversible soil throwing device, capable in one position of engaging the furrow slice when turned to the right and throwing it to the right, and when adjusted to another position capable of engaging the furrow slice when turned to the left and throwing it to the left, and means for operatively connecting the plow and soil throwing device whereby a reversal of the position of the soil throwing device will automatically reverse the position of the plow.

5. In an implement of the class described, the combination of a means for cutting a furrow slice and turning it either to the right or to the left of the line of advance, and a soil throwing device capable of movement to position for engaging said furrow slice when turned either to the right or left, and means for rotating said soil throwing device in the direction for throwing soil laterally away from the implement in the same direction as the furrow slice is being turned.

6. In an implement of the class described, the combination of a means for cutting a furrow slice and turning it either to the right or to the left of the line of advance, and a soil throwing device capable of movement to position for engaging said furrow slice when turned either to the right or left, and means for rotating said soil throwing device in the direction for throwing soil laterally away from the implement in the same direction as the furrow slice is being turned, said soil throwing device including helicoid blades for throwing soil upwardly and laterally.

7. In an implement of the class described, the combination of a means for cutting a furrow slice and turning it either to the right or to the left of the line of advance, and a soil throwing device carried by the implement and capable of being shifted to position for receiving a furrow slice when turned toward the left, and also to position for receiving a furrow slice when turned toward the right, and means for rotating the soil throwing device when in either of said positions in such direction as to throw soil laterally in the same direction in which the furrow is being turned.

8. In an implement of the class described, the combination of a means for cutting a furrow slice and turning it either to the right or to the left of the line of advance, and a soil throwing device carried by the implement and capable of being shifted to position for receiving a furrow slice when turned toward the left, and also to position for receiving a furrow slice when turned toward the right, and means for rotating the soil throwing device when in either of said positions in such direction as to throw soil laterally in the same direction in which the furrow is being turned, said soil throwing device having helicoid blades so arranged as to give an upward inclination to the soil being thrown laterally therefrom.

9. In an implement of the class described, the combination of a reversible means for cutting a furrow slice and throwing it laterally either to the right or left of the line of advance, and a soil throwing device carried by the implement and comprising a shaft, a set of soil engaging blades arranged at each end portion of the shaft, means for adjusting the shaft whereby it may be moved to a substantially upright position with either set of soil engaging blades at the lower end of the shaft, and means for rotating the shaft.

10. In an implement of the class described, the combination of a reversible means for cutting a furrow slice and throwing it laterally either to the right or left of the line of advance, and a soil throwing device carried by the implement and comprising a shaft, a set of soil engaging blades arranged at each end portion of the shaft, means for adjusting the shaft whereby it may be moved to a substantially upright position with either set of soil engaging blades at the lower end of the shaft, and means for rotating the shaft, both of said sets of blades being of helicoid formation and so arranged that the lower set of blades will be positioned to receive a furrow slice from the furrow cutting and turning device and throw it upwardly and laterally toward the same side of the implement as the furrow slice is being turned.

11. In an implement of the class described, an earth throwing device, comprising a frame, a bracket pivoted to the frame, a shaft rotatably mounted in said bracket, means for rotating said shaft, and a set of soil engaging blades at each end of the shaft, said bracket being so arranged that it may be moved from one position with one end of the shaft extended downwardly to position with the other end of the shaft extended downwardly.

12. In an implement of the class described, an earth throwing device, comprising a frame, a bracket pivoted to the frame, a shaft rotatably mounted in said bracket, means for rotating said shaft, and a set of soil engaging blades at each end of the shaft, said bracket being so arranged that it may be moved from one position with one end of the shaft extended downwardly to position with the other end of the shaft extended downwardly, said blades at one end of the shaft being of helicoid formation and at the other end of helicoid formation in reversed position for the purposes stated.

13. In an implement of the class described, an earth throwing device, comprising a frame, a bracket pivoted to the frame, a shaft rotatably mounted in said bracket, means for rotating said shaft, and a set of soil engaging blades at each end of the shaft, said bracket being so arranged that it may be moved from one position with one end of the shaft extended downwardly to position with the other end of the shaft extended downwardly, said blades at one end of the shaft being of helicoid formation and at the other end of helicoid formation in reversed position for the purposes stated, said bracket being of such length that when extended laterally from its pivotal support in one direction, it will support the shaft in one position and when extended laterally in the other direction it will support the shaft in an upright position spaced laterally a substantial distance from said first mentioned position.

14. In an implement of the class described, the combination of a frame, a reversible plow carried by the frame and pivotally supported by the frame on a fore and aft line and so constructed that when turned in one position it will cut a furrow slice and throw it toward the left, and when adjusted to another position, it will cut a furrow slice and throw it toward the right, a bracket pivotally supported upon the frame on a fore and aft axis and extended outwardly from the axis, a rotatable shaft carried by the outer end of the bracket, means for rotating the shaft, a set of soil engaging blades at each end of said shaft, said parts being so proportioned that when the shaft is in an upright position with the bracket extended toward the left and the plow is adjusted to its position for throwing a furrow slice toward the left, then the soil engaging blades on the lower end of the bracket will be in position to engage the furrow slice when it has been turned to a substantially upright position and when the plow has been reversed to throw the furrow slice toward the right and the bracket has been adjusted to extend toward the right the opposite set of blades on the shaft will be in position to engage the furrow slice from the plow and throw it toward the right.

15. In an implement of the class described, the combination of a frame, a reversible plow carried by the frame and pivotally supported by the frame on a fore and aft line and so constructed that when turned in one position it will cut a furrow slice and throw it toward the left, and when adjusted to another position, it will cut a furrow slice and throw it toward the right, a bracket pivotally supported upon the frame on a fore and aft axis and extended outwardly from the axis, a rotatable shaft carried by the outer end of the bracket, means for rotating the shaft, a set of soil engaging blades at each end of said shaft, said parts being so proportioned that when the shaft is in an upright position with the bracket extended toward the left and the plow is adjusted to its position for throwing a furrow slice toward the left, then the soil engaging blades on the lower end of the bracket will be in position to engage the furrow slice when it has been turned to a substantially upright position and when the plow has been reversed to throw the furrow slice toward the right and the bracket has been adjusted to extend toward the right the opposite set of blades on the shaft will be in position to engage the furrow slice from the plow and throw it toward the right, the said blades being of helicoid formation and arranged in opposite directions upon the shaft.

16. In an implement of the class described, the combination of a frame, a reversible plow carried by the frame and pivotally supported by the frame on a fore and aft line and so constructed that when turned in one position it will cut a furrow slice and throw it toward the left, and when adjusted to another position, it will cut a furrow slice and throw it toward the right, a bracket pivotally supported upon the frame on a fore and aft axis and extended outwardly from the axis, a rotatable shaft carried by the outer end of the bracket, means for rotating the shaft, a set of soil engaging blades at each end of said shaft, said parts being so proportioned that when the shaft is in an upright position with the bracket extended toward the left and the plow is adjusted to its position for throwing a furrow slice toward the left, then the soil engaging blades on the lower end of the bracket will be in position to engage the furrow slice when it has been turned to a substantially upright position and when the plow has been reversed to throw the furrow slice toward the right and the bracket has been adjusted to extend toward the right the opposite set of blades on the shaft will be in position to engage the furrow slice from the plow and throw it toward the right, and means for operatively connecting the said bracket with the plow whereby when the bracket is moved from position extended laterally in one direction to position extended laterally in the other direction, the plow will be reversed in its position.

17. In an implement of the class described, the combination of a frame, a reversible plow carried by the frame and pivotally supported by the frame on a fore and aft line and so constructed that when turned in one position it will cut a furrow slice and throw it toward the left, and when adjusted to another position, it will cut a furrow slice and throw it toward the right, a bracket pivotally supported upon the frame on a fore and aft axis and extended outwardly from the axis, a rotatable shaft carried by the outer end of the bracket, means for rotating the shaft, a set of soil engaging blades at each end of said shaft, said parts being so proportioned that when the shaft is in an upright position with the bracket extended toward the left and the plow is adjusted to its position for throwing a furrow slice toward the left, then the soil engaging blades on the lower end of the bracket will be in position to engage the furrow slice when it has been turned to a substantially upright position and when the plow has been reversed to throw the furrow slice toward the right and the bracket has been adjusted to extend toward the right the opposite set of blades on the shaft will be in position to engage the furrow slice from the plow and throw it toward the right, and means for operatively connecting the said bracket with the plow whereby when the bracket is moved from position extended laterally in one direction to position extended laterally in the other direction, the plow will be reversed in its position, and means for locking the said parts in their various positions of adjustment.

18. In an implement of the class described, the combination of a carriage, a reversible plow mounted in the carriage and capable of cutting a furrow slice and throwing it toward the left when the plow is in one position and toward the right when the plow is in its other position, and means for connecting the carriage to a tractor or the like, and for laterally adjusting the carriage relative to the tractor, a crank arm pivotally connected on a fore and aft line to the carriage and having a hitch coupling extended forwardly therefrom for connecting to a tractor, and gearing mechanism interposed between the carriage and the crank arm for turning the crank arm so that its hitch device extends either toward the left or to the right of the pivotal point of the crank arm.

19. In an implement of the class described, the combination of a carriage, a reversible plow mounted in the carriage and capable of cutting a furrow slice and throwing it toward the left when the plow is in one position and toward the right when the plow is in its other position, and means for connecting the carriage to a tractor or the like, and for laterally adjusting the carriage relative to the tractor, a crank arm pivotally connected on a fore and aft line to the carriage and having a hitch coupling extended forwardly therefrom for connecting to a tractor, and gearing mechanism interposed between the carriage and the crank arm for turning the crank arm so that its hitch device extends either toward the left or to the right of the pivotal point of the crank arm, said gearing device comprising a worm gear wheel rotatably supported by the carriage, and the worm provided with the crank mounted in a suitable support and in mesh with the worm gear wheel.

EDGAR V. COLLINS.